United States Patent Office 2,746,556
Patented May 22, 1956

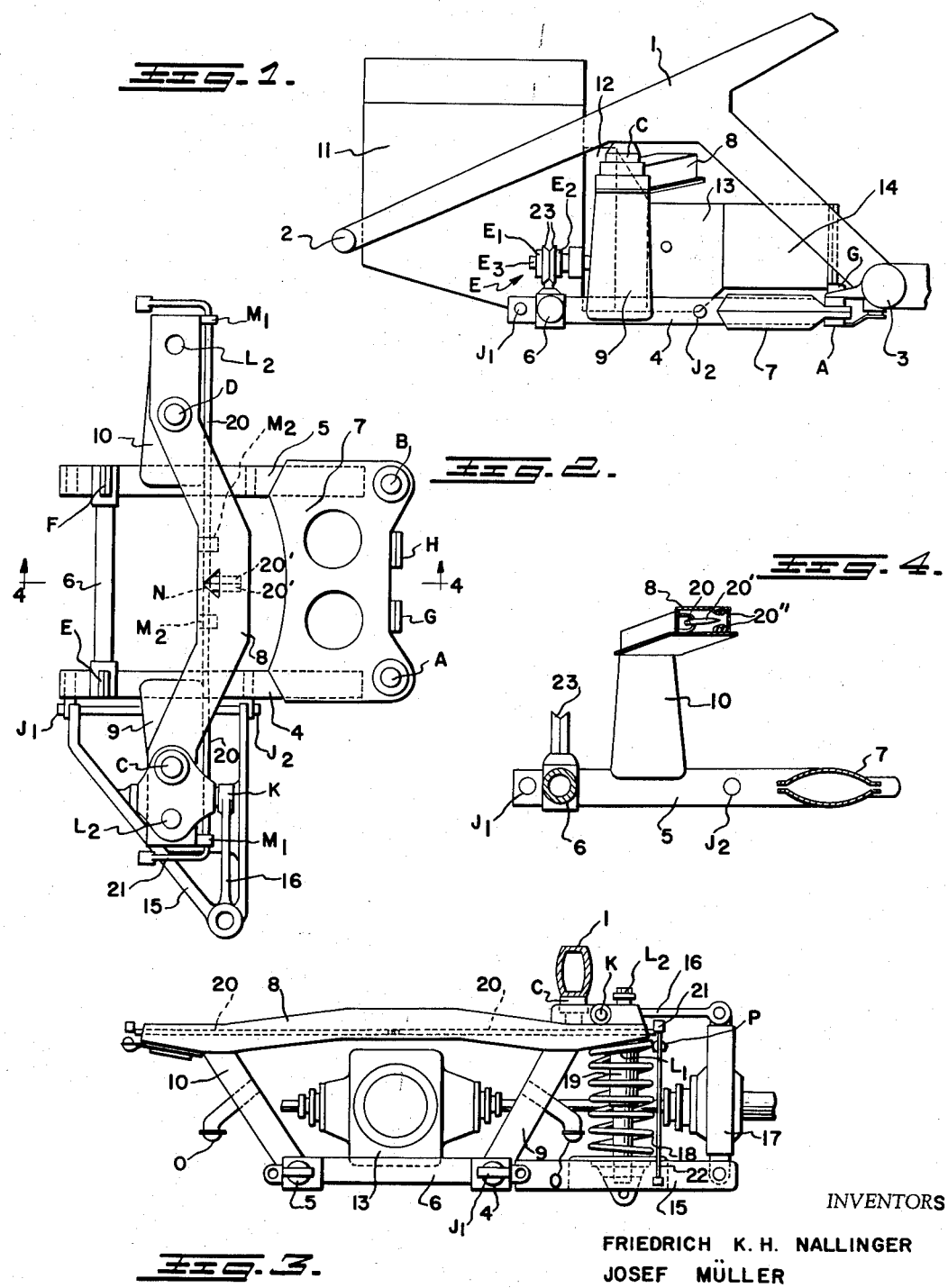

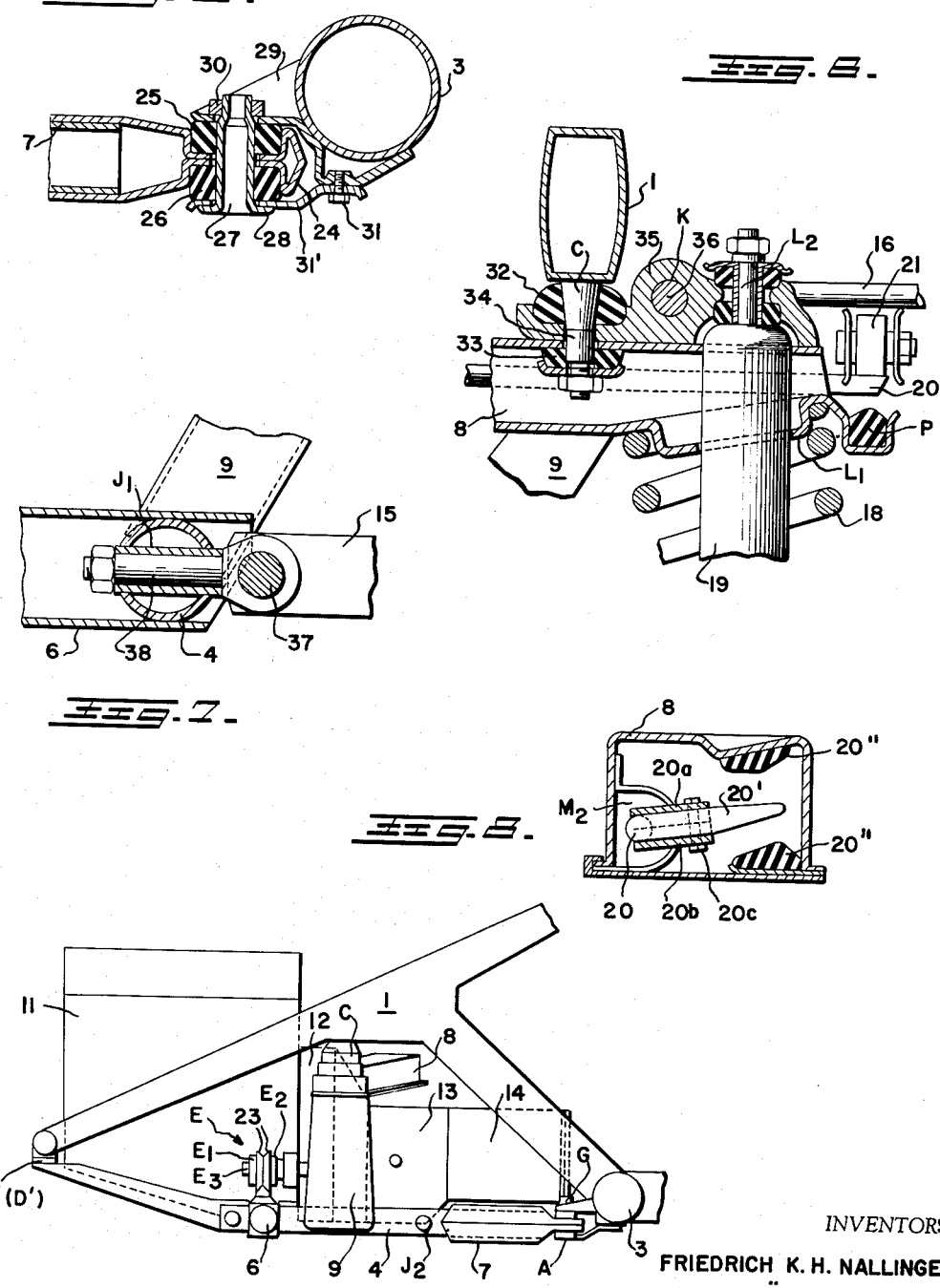

2,746,556

VEHICLE FRAME RESILIENTLY MOUNTED ON INDEPENDENTLY - SPRUNG - WHEEL - SUPPORTED, MOTOR-CARRYING SUBFRAME

Friedrich K. H. Nallinger and Josef Müller, Stuttgart, Germany, assignors to Daimler-Benz Aktiengesellschaft, Stuttgart-Unterturkheim, Germany Application April 7, 1950, Serial No. 154,551

Claims priority, application Germany April 20, 1949

3 Claims. (Cl. 180—12)

This invention relates to an improved manner of mounting an axle unit or a power plant unit in motor vehicles. Objects of the present invention are preferably to simplify the installation of the axle unit or of the power plant unit and the assembly of the whole vehicle, furthermore, to provide mounting means especially adapted to absorb the forces occurring in the units and transmit them in a most advantageous manner.

The invention relates more particularly to the employment of an auxiliary frame and to the particular conformation of the same especially for attaining a high degree of rigidity, to an advantageous manner of manufacture and to a suitable mounting of the units, axle parts and spring systems on the auxiliary frame and further to an advantageous manner of attaching the auxiliary frame to the vehicle superstructure, vehicle body, vehicle frame, or the like.

The invention is of particular value for the series production of motor vehicles and also for such manufacture where one type of axle unit or power plant unit is used for different types of vehicles.

To these and other useful ends the invention consists of parts, combinations of parts or their equivalents and manner of operation as hereinafter described and claimed and shown in the accompanying drawing in which:

Fig. 1 is a side view of the arrangement provided by the present invention showing the auxiliary frame mounted or the front supporting-structure of a self-supporting chassis, Fig. 2 is a top plan view of the arrangement illustrated in Figure 1, Fig. 3 is a front view of the arrangement of Figure 1 partially in section and with certain vehicle parts omitted, for clarity's sake, Fig. 4 is a section on line 4—4 of Fig. 2 through the auxiliary frame taken on the symmetrical longitudinal vertical plane of the same, Fig. 5 is a section on an enlarged scale through the rear mounting of the auxiliary frame on the supporting structure of the chassis, such as mountings A and B, Fig. 6 is a section on an enlarged scale through one end of the upper cross-member of the auxiliary frame, Fig. 7 is a section on an enlarged scale through the link means of the lower wheel-guide-link on the auxiliary frame, such as link points $J_1$ or $J_2$, Fig. 8 is a section on an enlarged scale through the support of the stabilizer in the interior of the upper cross-member of the auxiliary frame, such as at supporting point N, and Figure 9 is a side view of a modification in accordance with the present invention similar to Figure 1.

In the supporting structure 1 (illustrated in Fig. 1) of a self-supporting chassis with front cross-members 2, and a cross member 3 located between engine space and driver's cab, the auxiliary frame is resiliently supported on two rear mountings A and B and two front mountings C and D. The auxiliary frame consists essentially of the two longitudinal members 4 and 5, a front cross-member 6, a rear cross-member 7, a central upper cross-member 8 and the two trusses 9 and 10 which, as plainly shown in Fig. 3, spread out in the form of a V, or brace-like toward the top and away from each other, with their cross-section being enlarged toward the longitudinal members 4 and 5.

The power plant unit consisting of engine 11, flywheel and clutch housing 12, axle gear 13 and change-speed gear 14 is supported on the auxiliary frame. The mounting is effected on two lateral mountings E and F, for example, arranged below the center of gravity of the power plant unit, and likewise on two rear mountings G and H especially adapted to take the reaction moment. Supported on the two longitudinal members of the auxiliary frame are also forked lower guide-links 15 at $J_1$ and $J_2$ and at K upper guide-links 16 for the wheel support 17 of the driven wheels. The ends of the upper cross-member 8 projecting beyond the trusses 9 and 10 also serve at $L_1$ as seat for a coil spring 18 and at $L_2$ as seat for a telescopic shock absorber 19 arranged in the center of the coil spring. Within the upper cross-member 8 is also arranged a stabilizer 20 developed as torsion bar consisting of two torsion bar halves. The two stabilizer halves 20 are bent to one side at the ends 20' thereof, as shown in Figure 2. Each stabilizer half 20 is supported at the upper cross member 8 at $M_1$ and $M_2$ and both halves 20 of the stabilizer are secured together at their bent ends 20' at N within the cross member in such a manner that, as clearly shown in Fig. 8 the connected ends 20' of the torsion bar halves do not press against the rubber stops 20" on the auxiliary frame until a definite torsional movement has taken place and thereby allows the wheels also to recoil under equally large and equi-directed up and down movements. The two bent ends 20' of the two stabilizer halves 20 may be secured together in any conventional manner as, for example, by means of two cover-like or clamp-like parts 20a and 20b, as shown in Figure 8, which are threadably connected together on both sides of the stabilizer ends 20' by means of screws 20c. Such an arrangement within a cross member results in an especially well protected and also space saving arrangement of the stabilizer. Actuation of the stabilizer ensues by way of example from the lower guide-link 15 by means of a rod 22. In order to limit the upward movements of the road wheels rubber bumpers O may be provided on the trusses 10 and, to limit the downward movements, rubber bumpers P against which are pressed the ends 21 of the stabilizer which are bent in the form of a lever, and which together with the actuating rods 22 serve in this case as stabilizer straps.

The auxiliary frame consists of certain constructional details which will presently be described. All structural members of the auxiliary frame are tube or box-section girders. The longitudinal members 4 and 5 and also the front cross-member 6, by way of example, are tube-section girders, whereas the rear cross-members 7 are especially wide oval-section girders. The upper cross-member 8 and also the trusses 9 and 10 are suitably of box-section construction. All girders are made up of two sheet-metal stampings welded together on two longitudinal seams. In like manner all girders are mutually connected into an all-welded structural unit, being twist-free and securely braced in the corners. The rigidity may yet be increased thereby that the individual girders may run through or embrace one another. The oval-section cross member 7, lying on its side, is slipped over the ends of the longitudinal members 4, 5 and welded to them into a rigid unitary structure. The auxiliary frame is provided thereby at an especially suitable place with an especially high degree of rigidity and stability and consequently especially suitable to absorb the driving thrusts or driving and braking forces.

Mountings 23 made up of two sheet-metal stampings each are provided for mounting the engine at the points E and F and they are either welded or screwed to the the points where the longitudinal members 4, 5 meet the cross members 6, on which mountings the engine is suspended, for example, by means of rubber rings $E_1$ and $E_2$, under thrust load, with a horizontal pin $E_3$. The rear engine-mounting at the points G and H is taken care of by means of bracket-like rubber plates (not shown) likewise under thrust load.

The means for mounting the auxiliary frame at the points A and B are shown in detail in Fig. 5. For this purpose the two sheet-metal stampings of the cross members 7 are compressed to form bearing eyes 24 at the point of support, and the rubber bumpers 25 and 26 are inserted into these eyes from above and below. A bolt 27, likewise a pressed piece and having a disc-like enlargement 28 at its lower end, is inserted into the rubber bumpers from below and extends through the latter and through the opening in an arm 29 on the cross member 3 of the chassis and is secured thereto by means of a nut 30. The bolt 27 itself is likewise secured to the cross member 3 by a bolt 31 and a bracket 31' engaged by the disc-like portion 28.

In Fig. 6 it will be seen that the auxiliary frame is likewise mounted by means of rubber bumpers 32 and 33 at the points C and D on the supporting structure 1. For this purpose conical bolts 34 are welded to the upper portions of the girders of the latter, over these bolts the rubber bumpers 32 and 33 are slipped and pressed against each other and also against the wall of the girder 8 or against a bearing body 35 secured to the cross member 8. The bearing bracket 35 serves at the same time (at $L_2$) as support for the shock absorber 19 and also (at K) to support the upper guide-link 16 in the bore 36.

As clearly shown in Fig. 7 the lower guide-links 15 are linked at $J_1$ or $J_2$ by means of joints 37, which by means of bolts 38 are inserted into the longitudinal girders 4 respectively 5 of the auxiliary frame, and articulated thereto.

At the points indicated by the capital letters A through P forces are transmitted to the auxiliary frame. This being the case the points of application of these forces concentrate mainly around those points in which two girders of the auxiliary frame intersect and brace each other and thereby assure an especially suitable transmission and uniform distribution of the forces over the entire auxiliary frame forming a tridimensional structural system.

Thus by reference to the drawing it will be seen that the weight of the power plant unit is supported essentially freely at the suspension points E and F by the auxiliary frame secured to the chassis at A, B and C, D. However, the auxiliary frame may also be mounted instead at C, D or instead at A, B or also in addition to these, for example, at C', D' on the girders 1 and 2 of the chassis supporting structure and for this purpose the longitudinal girders 4 and 5 of the auxiliary frame may be extended up to the cross member 2 of the chassis. Figure 9 illustrates a modification in which the auxiliary frame is mounted on the chassis at points C' and D' instead of at points C and D of Figure 1. For that purpose, the longitudinal girders 4 and 5 are extended up to the cross member 2 of the chassis. In all other respects, Figure 9 is similar to Figure 1 and similar reference numerals are used to designate like parts. In connection with this, the extensions 4 and 5 are suitably so arranged that their lower edge lies lower than the lowest contour of the engine's oil pan and thereby protect the same against damage, for example, in case of greater rebounds of the frame toward the road surface. Other vehicle parts and units as, for example, radiator, steering gear, battery or such like may also be supported on the auxiliary frame.

Instead of being mounted at E and F, the engine or power plant unit may also be mounted in the center of gravity or above the same on the auxiliary frame, for example, on the upper girder 8 or on the trusses 9 and 10 or on the intersection point of the same with the upper cross girder. Instead of at E and F provisions for mounting may also be made, for example, on the extended longitudinal girders of the auxiliary frame connected at C' and D' to the supporting structure of the chassis.

Having described only a typical preferred form and application of our invention, we do not wish to be limited or restricted to the specific form and application herein set forth, but wish to reserve to ourselves any modification or variation that may appear to those skilled in the art or fall within the scope of the following claims:

What we claim is:

1. In a suspension system for a motor vehicle with road wheels the combination of a sub-frame for said vehicle, a bridgelike structure including upwardly directed truss members and an upper cross-member forming part of said sub-frame and located transverse thereof, suspension means for said road wheels, means substantially in the vertical plane of said bridgelike structure attaching said suspension means to said sub-frame, a vehicle body, a plurality of pairs of resilient mounting means supporting one end of the vehicle body on said sub-frame, said pairs of mounting means being longitudinally spaced with respect to said vehicle body, one pair of said mounting means being attached to said bridgelike structure and another pair of said mounting means being located towards a transverse central vertical plane of the vehicle body, a power plant unit, means resiliently supporting said power plant unit on said sub-frame including a plurality of longitudinally spaced mounting means, one end of said power plant unit being supported on said sub-frame by some of said last-mentioned mounting means on the side opposite of said another pair of mounting means, so that the moment of the power unit on the one side of said suspension means counteracts the moment of the vehicle body on the other side thereof, and torsion rod stabilizer means connected to said suspension means and extending along said bridgelike structure, both said bridgelike structure and said torsion rod stabilizer means extending transversely of the vehicle above a portion of said power plant unit.

2. In a suspension system for a motor vehicle with road wheels the combination of a sub-frame for said vehicle, a bridgelike structure including upwardly directed truss members and an upper cross-member forming part of said sub-frame and located transverse thereof, suspension means for said road wheels, means substantially in the vertical plane of said bridgelike structure attaching said suspension means to said sub-frame, a vehicle body, a plurality of pairs of resilient mounting means supporting one end of the vehicle body on said sub-frame, said pairs of mounting means being longitudinally spaced with respect to said vehicle body, one pair of said mounting means being attached to said bridgelike structure and another pair of said mounting means being located towards a transverse central vertical plane of the vehicle body, a power plant, unit means resiliently supporting said power plant unit on said sub-frame including a plurality of longitudinally spaced mounting means, and torsion rod stabilizer means connected to said suspension means and extending along said bridgelike structure, both said bridgelike structure and said torsion stabilizer means extending transversely of the vehicle above a portion of said power plant unit.

3. In a suspension system for a motor vehicle with road wheels the combination of a sub-frame for said vehicle, a bridgelike structure including upwardly directed truss members and an upper cross-member forming part of said sub-frame and located transversely thereof, suspension means for said road wheels, means substantially in the vertical plane of said bridgelike structure attaching said suspension means to said sub-frame, a vehicle body, a plurality of pairs of resilient mounting means supporting one end of the vehicle body on said sub-frame, said pairs of mounting means being longitudinally spaced with respect to said vehicle body, one pair of said mounting means being attached to said bridgelike structure and another pair of said mounting means being located towards a transverse central vertical plane of the vehicle body, a power plant unit, means resiliently supporting said power plant unit on said sub-frame including a plurality of longitudinally spaced mounting means, torsion rod stabilizer means connected to said suspension means and extending along said bridgelike structure, and means connected to said torsion rod stabilizer means to enable said road wheels to recoil under equally large and equi-directed up and down movements of predetermined magnitude and to render said torsion rod stabilizer means effective to resist equi-directed up and down movements in excess of said predetermined amount, both said bridgelike structure and said stabilizer means extending transversely of the vehicle above a portion of said power plant unit.

References Cited in the file of this patent

UNITED STATES PATENTS

| Number | Name | Date |
|---|---|---|
| 1,829,251 | Whittington et al. | Oct. 27, 1931 |
| 1,846,567 | Murray, Jr. | Feb. 23, 1932 |
| 1,948,744 | Curtiss | Feb. 27, 1934 |
| 1,948,745 | Curtiss | Feb. 27, 1934 |
| 2,013,599 | Butler | Sept. 3, 1935 |
| 2,015,700 | Wagner | Oct. 1, 1935 |
| 2,047,336 | Stout | July 14, 1936 |
| 2,052,009 | Woolson | Aug. 25, 1936 |
| 2,074,158 | Avery | Mar. 16, 1937 |
| 2,107,382 | Maddock | Feb. 8, 1938 |
| 2,139,750 | Hicks | Dec. 13, 1938 |
| 2,148,781 | Smith | Feb. 28, 1939 |
| 2,174,922 | Kuiper | Oct. 3, 1939 |
| 2,208,709 | Tjaarda | July 23, 1940 |
| 2,253,666 | Wagner | Aug. 26, 1941 |
| 2,314,505 | McIntyre et al. | Mar. 23, 1943 |
| 2,322,477 | Sjoberg | June 22, 1943 |
| 2,344,072 | Winkelmann | Mar. 14, 1944 |
| 2,344,380 | Wilfert et al. | Mar. 14, 1944 |
| 2,351,650 | Wulff | June 20, 1944 |
| 2,439,659 | Julien | Apr. 13, 1948 |
| 2,480,047 | Reinhard | Aug. 23, 1949 |
| 2,509,803 | Booth | May 30, 1950 |
| 2,633,203 | Paton | Mar. 31, 1953 |

FOREIGN PATENTS

| Number | Country | Date |
|---|---|---|
| 996,953 | France | Sept. 5, 1951 |
| 662,538 | Great Britain | Dec. 5, 1951 |
| 245,565 | Switzerland | Nov. 17, 1947 |